(12) United States Patent
Miyagawa et al.

(10) Patent No.: US 8,298,442 B2
(45) Date of Patent: *Oct. 30, 2012

(54) METHOD OF MANUFACTURING PHOSPHOR TRANSLUCENT CERAMICS AND LIGHT EMITTING DEVICES

(75) Inventors: Hiroaki Miyagawa, Oceanside, CA (US); Toshitaka Nakamura, Osaka (JP); Hironaka Fujii, Carlsbad, CA (US); Amane Mochizuki, Carlsbad, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,344

(22) Filed: Jan. 25, 2012

(65) Prior Publication Data
US 2012/0119148 A1    May 17, 2012

Related U.S. Application Data

(63) Continuation of application No. 12/388,936, filed on Feb. 19, 2009, now Pat. No. 8,137,587.

(51) Int. Cl.
*C09K 11/08* (2006.01)

(52) U.S. Cl. ............ 252/301.4 R; 264/21; 252/301.4 F; 252/301.4 H; 252/301.6 F

(58) Field of Classification Search . 252/301.4 R–301.6 F; 264/21
See application file for complete search history.

(56) References Cited

U.S. PATENT DOCUMENTS

| | | | |
|---|---|---|---|
| 5,625,256 A | 4/1997 | Tiedt et al. | |
| 5,998,925 A | 12/1999 | Shimizu et al. | |
| 6,059,936 A | 5/2000 | Cathey et al. | |
| 6,069,440 A | 5/2000 | Shimizu et al. | |
| 6,180,029 B1 | 1/2001 | Hampden-Smith et al. | |
| 6,482,387 B1 | 11/2002 | Gulgun et al. | |
| 6,630,691 B1 | 10/2003 | Mueller-Mach et al. | |
| 6,706,212 B2 * | 3/2004 | Venkataramani et al. | 252/301.4 F |
| 6,844,285 B1 | 1/2005 | Wei | |
| 7,126,274 B2 | 10/2006 | Shimizu et al. | |
| 7,253,129 B2 | 8/2007 | Takagimi et al. | |
| 7,361,938 B2 | 4/2008 | Mueller et al. | |
| 2003/0102288 A1 | 6/2003 | Lu et al. | |
| 2004/0167010 A1 | 8/2004 | Sato et al. | |
| 2005/0269582 A1 | 12/2005 | Mueller et al. | |
| 2007/0010035 A1 | 1/2007 | Liu et al. | |
| 2007/0182037 A1 | 8/2007 | Rabinovitch et al. | |
| 2008/0108496 A1 | 5/2008 | Gratson et al. | |

FOREIGN PATENT DOCUMENTS

JP    2-209987    8/1990

(Continued)

OTHER PUBLICATIONS

Chaim, R., et al., "Transparent yttrium aluminum garnet (YAG) ceramics by spark plasma sintering", J. Eur. Ceramic Soc., 27(2007):3331-3337.

(Continued)

*Primary Examiner* — Carol M Koslow
(74) *Attorney, Agent, or Firm* — Knobbe, Martens, Olson & Bear, LLP

(57) ABSTRACT

Disclosed herein is a method of increasing the luminescence efficiency of a translucent phosphor ceramic. Other embodiments are methods of manufacturing a phosphor translucent ceramic having increased luminescence. Another embodiment is a light emitting device comprising a phosphor translucent ceramic made by one of these methods.

20 Claims, 2 Drawing Sheets

FOREIGN PATENT DOCUMENTS

| | | |
|---|---|---|
| WO | WO 2007/107896 A1 | 9/2007 |
| WO | WO 2007/107915 A1 | 9/2007 |
| WO | WO 2007/107917 A2 | 9/2007 |
| WO | WO 2009/083887 | 7/2009 |

OTHER PUBLICATIONS

Chiang, et al, "Luminescent Properties of Cerium-Activated Garnet Series Phosphor: Structure and Temperature Effects", Journal Electrochemical Society. vol. 155 (6) B517-B520(2008).

R. Kasuya et al., "Characteristic optical properties of transparent color conversion film prepared from YAG:Ce3+ nanoparticles," Applied Physics Leters, 91, 111916 (2007).

Jianren Lu et al., "Neodymium doped yttrium aluminium garget (Y3Al5O12) nanocrystalline ceramics—a new generation of solid state laser and optical materials," Journal of Alloys and Compounds 341 (2002) 220-225.

Nyman, et al., "Comparison of Solid-State and Spray-Pyrolysis Synthesis of Yttrium Aluminate Powders", Journal of the American Ceramic Society, 80(5): 1231-1238 (1997).

Ramanathan, S. , et al, "Transparent YAG from powder prepared by homogeneous precipitation reaction-Al(NO3)3 + Y(NO3)3 + (NH4)2SO4 + CO(NH2)2", J Materials Sci. Letters 20 (2001):2119-2121.

Ryu, J.H. et al., Luminescent Properties of Ca-a-SiAlON:Eu2+ Phosphors Synthesized by Gas-Pressured Sintering, Journal of the Electrochemical Society, 155(4), J99-J104 (2008).

Hideki Yagi et al., "Characterizations and laser performances of highly transparent Nd3+:Y3Al5O12 laser ceramics," Optical Materials 29 (2007) 1258-1262.

Yen, et al., "Inorganic Phosphors: Compositions, Preparation and Optical Properties", CRC press (2004). Sections 1, 2, and 6 only.

* cited by examiner

METHOD OF MANUFACTURING PHOSPHOR TRANSLUCENT CERAMICS AND LIGHT EMITTING DEVICES

CROSS-REFERENCE TO RELATED APPLICATIONS

This application is a continuation of U.S. application Ser. No. 12/388,936, filed Feb. 19, 2009, now U.S. Pat. No. 8,137,587, which is hereby incorporated by reference in its entirety.

BACKGROUND

1. Field

The present application relates to light emitting devices, such as light emitting devices comprising phosphor translucent ceramics.

2. Description of the Related Art

White light-emitting devices may be fabricated using a combination of a blue light-emitting diode (LED) and a phosphor material. These devices are often configured so that the blue light from the blue light-emitting diode comes in contact with the phosphor material so that the phosphor material may absorb a portion of the blue light and emit light that is of a longer wavelength. As a result, these materials have been described as wavelength converting or color changing. This allows the device to emit a combination of light that appears more white. There are two common methods for doing so. First, the phosphor particles may be dispersed in another solid component through which the light passes, thus coming into contact with the dispersed phosphor particles. Second, the phosphor material may be in the form of a phosphor ceramic compact, in which case the blue light would pass through the compact.

The disadvantage of the phosphor particles is that particles that are large enough to be emissive have a tendency to scatter the light, thus reducing the light emission of the device. On the other hand, the phosphor ceramic compacts are generally prepared by sintering under conditions that may affect the luminescent efficiency and/or other physical characteristics of the phosphor ceramic. Furthermore, the conventional temperatures of sintering phosphor materials are in excess of 1600° C., which may require more energy than is desirable. Thus, there is a need for a translucent phosphor ceramic compact with improved luminescence.

SUMMARY

Some embodiments provide a method of increasing the luminescence efficiency of a translucent phosphor ceramic, comprising heating the translucent phosphor ceramic at a temperature of at least about 1200° C. under a reducing atmosphere thereby increasing the luminescence efficiency.

Some embodiments provide a method of manufacturing a phosphor translucent ceramic having an increased luminescence. The method comprises providing a precursor composition and heating the precursor composition under both a reducing atmosphere and under vacuum.

Some embodiments provide a method of manufacturing a phosphor translucent ceramic compact having increased luminescence. The method comprises providing a precursor composition, heating the precursor composition at a temperature sufficient to form a translucent phosphor ceramic, and heating the translucent phosphor ceramic at a temperature of at least about 1200° C. under a reducing atmosphere.

In some embodiments, providing a precursor composition comprises providing a mixture comprising a plurality of phosphor particles or ceramic raw materials, binder, and flux material, and heating the mixture at a temperature of at least about 500° C. in an atmosphere comprising oxygen gas.

DETAILED DESCRIPTION

Figure 1:
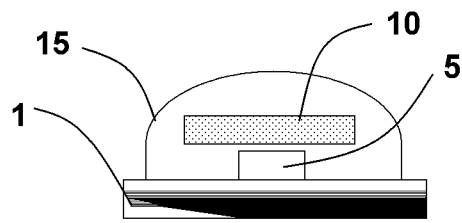
FIG. 1 is a schematic diagram of one example of a device comprising a phosphor translucent ceramic disclosed herein.

Unless otherwise indicated, "annealing," "anneal," or "annealed" refers to applying heat to a material to convert at least part of the material from one phase to another desired phase. Thus, for example, in some embodiments, the annealing of a phosphor powder may involve the conversion of yttrium amorphous or yttrium aluminum perovskite (YAP) phase material to yttrium aluminum garnet material.

Unless otherwise indicated, "sintering," "sinter," or "sintered," refers to applying heat to a material to transform at least a portion of the material into a ceramic material. In some embodiments, this may be done by heating the material below its melting temperature, but enabling at least a portion of a plurality of particles of the material to adhere together and/or fill voids disposed between the particles.

One embodiment provides a method of preparing a translucent phosphor ceramic that has both high luminous efficiency and high transparency. The method comprises providing a precursor composition and heating the precursor composition both under vacuum and under a reducing atmosphere. The term "translucent phosphor ceramic" refers to a ceramic object that is translucent and comprises a plurality of phosphor particles which have adhered to one another to form a single piece object. In some embodiments, the translucent phosphor ceramic consists essentially of sintered phosphor particles. In some embodiments, the translucent phosphor ceramic comprises a rare earth doped phosphor material. The rare earth doped phosphor material may have a garnet structure. The rare earth doped phosphor material may comprise $(A_{1-x}E_x)_3B_5O_{12}$, wherein A is Y, Gd, La, Lu, Tb, or a combination thereof; x is from about 0.00005 to about 0.1; B is Al, Ga, In, or a combination thereof; and E is Ce, Eu, Tb, Nd, or a combination thereof. In some embodiments, x is from about 0.0001 to about 0.01, or alternatively, from about 0.001 to about 0.005. In some embodiments, A is Y; E is Ce; B is Al; and x is from about 0.00005 to about 0.1, from about 0.0001 to about 0.01, about 0.001 to about 0.005, or about 0.002. In some embodiments, the translucent ceramic is substantially free of one or more of binders, solvents, dispersants and/or flux materials. In some embodiments, the translucent phosphor ceramic may be prepared by a process comprising heating at least part of a plurality of particles. The plurality of particles may be any plurality of particles that can be converted to a translucent phosphor ceramic by the processes described herein. For example, the plurality of particles may be a plurality of phosphor particles, ceramic raw particles or ceramic raw materials.

In some embodiments, a precursor composition comprising a ceramic raw material is provided. In some embodiments, the ceramic raw materials may comprise raw powders for phosphor, inorganic phosphor material or a plurality of phosphor particles. In some embodiments, the ceramic raw material comprises raw powders of phosphor materials with an average particle size of less than about 1000 nm. In some embodiments, raw powders of phosphor materials may have an average particle size of less than about 500 nm. The raw powders for phosphor may be prepared using any conventional or suitable methods, including but not limiting to both wet chemical route and gas phase pyrolysis route. In some embodiments, raw powders made by any method, including those that are commercially available (e.g., purchased commercially), can be mixed in desired stoichiometric amounts prior to the formation of the compact and/or sintering step. For example, when making a ceramic plate with $Y_3Al_5O_{12}$: $Ce^{3+}$, stoichiometric amounts of $Y_2O_3$, $Al_2O_3$ and $CeO_2$ powders can be mixed together. The raw materials or powders do not need to have the same composition or crystal structure as the resultant phosphor ceramic plate or compact. For example, to prepare a YAG:Ce translucent ceramic plate, YAG:Ce powder, Y—Al—O—Ce containing amorphous powders, mixture of $YAlO_3$:Ce and $Al_2O_3$ powders, mixture of $Y_2O_3$, $Al_2O_3$ and $CeO_2$ powders, and any combination thereof may be used as the raw material.

In some embodiments, the plurality of particles or the ceramic raw material may comprise $(A_{1-x}E_x)_3B_5O_{12}$, wherein A is Y, Gd, La, Lu, Tb, or a combination thereof; x is from about 0.00005 to about 0.1; B is Al, Ga, In, or a combination thereof; and E is Ce, Eu, Tb, Nd, or a combination thereof. In some embodiments, x is from about 0.0001 to about 0.01, or alternatively, from about 0.001 to about 0.005. In some embodiments, A is Y; E is Ce; B is Al; and x is from about 0.00005 to about 0.1, from about 0.0001 to about 0.01, about 0.001 to about 0.005, or about 0.002.

In some embodiments, additional material such as binder resin, dispersant, and/or solvent may be added to the precursor composition to aid the mixing and molding processes. A binder is any substance that improves adhesion of the particles of the composition being heated to form a ceramic solid. Some non-limiting examples of binders include polyvinyl alcohol, polyvinyl acetate, polyvinyl chloride, polyvinyl butyral, polystyrene, polyethylene glycol, polyvinylpyrrolidones, polyvinyl acetates, and polyvinyl butyrates, etc. In some, but not all, circumstances, it may be useful for the binder to be sufficiently volatile that it can be completely removed or eliminated from the precursor mixture during the sintering phase.

The precursor composition can then be mixed and molded into a precursor compact. In some embodiments, the mixing process may be done using mortar and pestle, ball milling machine, or bead milling machine. In some embodiments, the molding process may involve using a simple die for tablet molding, hot isostatic pressing (HIP) or cold isostatic pressing (CIP). In some embodiments, controlled quantities of raw powders may be loaded into a mold followed by applying pressure to form a molded precursor compact. In other embodiments, slip casting of slurry solution of precursor composition may be utilized to make molded precursor compact. In some embodiments, small quantity of flux materials may be added to the precursor composition for improving sintering property. The term "flux material" refers to a substance that may increase the crystallinity of the phosphor or may reduce the sintering temperature by facilitating the sintering property of the ceramic. Examples of flux materials include, but are not limited to, alkali metal halides such as NaCl or KCl, silicon-containing materials, such as silica, magnesium containing materials such as MgO, and tetraethyl orthosilicate, and organic compounds such as urea.

In some embodiments, prior to heating or sintering the precursor compact, binder resin and/or residual organic matters may be removed from the precursor compact by a thermal pre-treatment. In these embodiments, the precursor compact may be heated in an atmosphere comprising oxygen, such as air, to a temperature high enough to decompose the binder resin. The atmosphere comprising oxygen gas may contain one or more additional inert gases. For example, mixtures of oxygen and argon or oxygen and nitrogen may be used. In one embodiment, the atmosphere comprising oxygen gas is air. In some embodiments, the precursor compact is heated to a temperature high enough to facilitate removal of substantially all the binder, solvent and dispersant materials. Depending upon the particular flux material used, such heating may also remove substantially all or a portion of the flux materials.

In some embodiments, the suitable temperature for the thermal pre-treatment is higher than the decomposition temperature of the binder resin and/or the organic matter, but is lower than the temperature at which the pores on the surface of the precursor compact are closed off. In some embodiments, the suitable temperature is about 500° C. to about 1000° C. In some embodiments, the thermal pre-treatment time is from 10 minutes to 100 hours, depending on the decomposition speed of the binder resin and the size of the precursor compact or molding.

The precursor compact is then heated or sintered under vacuum to a temperature of at least about 1450° C. but lower than the melting point of the material to thereby form a translucent ceramics. In some embodiment, the precursor compact is heated for a time period of from about 0.5 hours to about 100 hours. In some embodiments, the precursor compact is heated for a time of from about 2 hours to about 24 hours. In some embodiments, the precursor compact is heated from a time period of from about 3 to about 7 hours, or from about 3 hours to about 8 hours. In some embodiments, the precursor compact is heated or sintered under vacuum at a temperature of from about 1450° C. to about 2000° C. In some embodiments, the precursor compact is heated or sintered under vacuum at a temperature of from about 1600° C. to about 1850° C.

While not intending to be limiting, some embodiments are useful in counteracting or reducing some of the deficiencies of other related methods of preparing ceramic phosphors. For example, sintering under vacuum may be useful to produce void-free phosphor translucent ceramics, but it may not be able to achieve a high luminance efficiency. On the other hand, sintering a precursor compact only under a reducing atmosphere may increase the luminance efficiency of a YAG phosphor, but may result in a slightly reduced sintering property (such as transparency) as compared to as performed under a vacuum.

In some embodiments, phosphor translucent ceramics formed by the heating or the sintering described above may be subject to further heating under a reducing atmosphere to thereby improve the luminance efficiency. The phosphor translucent ceramics is heated under a reducing atmosphere at a temperature of at least about 1200° C., preferably at about 1200° C. to about 1800° C., or at about 1200° C. to about 1600° C. In some embodiments, the heating of the phosphor translucent ceramics may occur at a lower temperature than the heating or sintering of the precursor compact. In some embodiments, the heating of the phosphor translucent ceramics under reducing atmosphere may increase its luminance efficiency without significant reduction of translucency of the ceramics.

In some embodiments, the heating of the phosphor ceramic under a reducing atmosphere increases the luminescence efficiency of the resultant translucent phosphor ceramic, where the ceramic is prepared under a different atmospheric condition, e.g., under vacuum or air. Current sintering processes may include the application of temperatures in excess of about 1600° C., e.g., about 1650° C. to about 1700° C., to achieve a desired level of luminescence efficiency. In some embodiments, the application of the sintering step under reducing atmospheric conditions provides an increase in luminescence efficiency despite an initial sintering of the precursor compact at less than such conventional sintering temperatures. Furthermore, the application of the present sintering step under a reducing atmosphere increases the luminescent efficiency of ceramics initially sintered at temperatures in excess of such sintering temperatures, e.g., about 1600° C. Thus irrespective of how the translucent phosphor ceramic is made, the application of a reducing atmosphere at less than the previously disclosed sintering temperatures, e.g., about 1700° C., increases the luminescence efficiency of the resulting translucent phosphor ceramic.

The amount of time for which the material is heated under a reducing atmosphere may vary. In some embodiments, the heating under a reducing atmosphere may occur for about 0.5 hours to about 20 hours, about 3 hours to about 7 hours, or about 5 hours.

The term "reducing atmosphere" refers to an atmosphere that has a greater tendency to reduce a composition than air. Examples of reducing atmospheres include atmospheres comprising reducing gases such as hydrogen gas, ammonia, hydrazine, carbon monoxide, etc. Any reducing gas may also be diluted with nitrogen gas or an inert gas to provide a reducing atmosphere. For example, a reducing atmosphere may comprise a mixture of from about 1% (v/v) to about 10% (v/v) hydrogen gas ($H_2$) and about 90% (v/v) to about 99% (v/v) nitrogen gas ($N_2$), or from about 1% (v/v) to about 5% (v/v) $H_2$ and about 95% (v/v) to about 99% (v/v) $N_2$, or about 3%(v/v) $H_2$ and about 97% (v/v) $N_2$.

"Increasing the luminescence efficiency" refers to increasing the fraction of photons that are emitted for each excited electron present in a given translucent phosphor ceramic. The increase is compared to the translucent phosphor ceramic or a similar ceramic, which has not been heated under a reducing atmosphere. In some embodiments, the increased luminescence efficiency is characterized by increased emission from the translucent phosphor ceramic when the ceramic is exposed to radiation within the peak absorption wavelength profile but outside of the peak emissive wavelength profile, which is dependent upon the specific phosphor material. For example, for YAG:Ce3+, monochromatic light at a wavelength of between about 420 nm and about 460 nm would fall within its peak absorption wavelength profile. Inventors recognize that inspection of the absorptive and emissive peak profiles can result in other useful radiation wavelengths, e.g., ultraviolet radiation. Although any increase in emission is significant, in some embodiments, the increase in emission may be at least about 3%, or at least about 5%, or at least about 8%, or at least about 10%, or at least about 30% as compared to the translucent phosphor ceramic before it is heated under a reducing atmosphere.

In some embodiments, a precursor compact is heated under both vacuum and a reducing atmosphere. This may involve two separate heating steps. For example, the precursor compact could be subjected to a first heating step, allowed to cool to room temperature, and the atmosphere changed, then subjected to a second heating step. In other embodiments, this may also involve a single heating step with a change from a vacuum to a reducing atmosphere or visa versa. In some embodiments, the heating temperature may also be changed when the atmosphere is changed.

In some embodiments, the two heating phases may also be a single step in the sense that the precursor composition remains at an elevated temperature, or is not allowed to completely cool to room temperature, during or between the application of the two distinct atmospheres. For example, it may involve a heating process under different temperatures and the two distinct atmospheres, but which may all occur at elevated temperatures. For example, the vacuum heating may occur at a higher temperature than the heating under the reducing atmosphere, and the temperature may be constant or change during the heating under either or both of the distinct atmospheres.

While not intending to be limiting, in one exemplary process, any binder, solvent, dispersant, and flux material to be used in the process are added to the plurality of phosphor particles or the ceramic raw materials. This composition is mixed and then molded into a precursor compact. The precursor compact is then heated under vacuum to yield a phosphor translucent ceramic. Further heating under a reducing atmosphere then occurs. This heating step improves the luminance efficiency of the phosphor translucent ceramic. Optionally, the precursor compact may be heated in an atmosphere comprising oxygen prior to heating under vacuum to facilitate removal of substantially all of the binder, solvent and dispersant materials. Depending upon the particular flux materials used, such heating may also remove all or a portion of the flux materials.

Another embodiment provides a light emitting device comprising a phosphor translucent ceramic. The light emitting device may be any device which emits light. In one embodiment, the light emitting device is a light emitting diode (LED), an organic light emitting diode (OLED), or an inorganic electroluminescent device (IEL). Since the phosphor translucent ceramics disclosed herein may have high transparency and luminance efficiency, they may be useful when utilized as wavelength down converters for light emitting devices. A large variety of devices may be made which allow the light from the blue-LED to pass through the translucent phosphor ceramics, thus making the light appear more white.

In some embodiments, the phosphor translucent ceramics may be mounted into a blue-LED to yield a device that emits light that appears more white. FIG. 1 shows one of the examples of such a device's structure. In this device, the blue-LED 5 is fixed to a substrate 1, and the phosphor translucent ceramic 10 is positioned so that the blue-LED 5 is between the ceramic 10 and the substrate 1. The blue-LED 5 and ceramic 10 are encapsulated by a resin 15, which is attached to the substrate 1.

Figure 2:
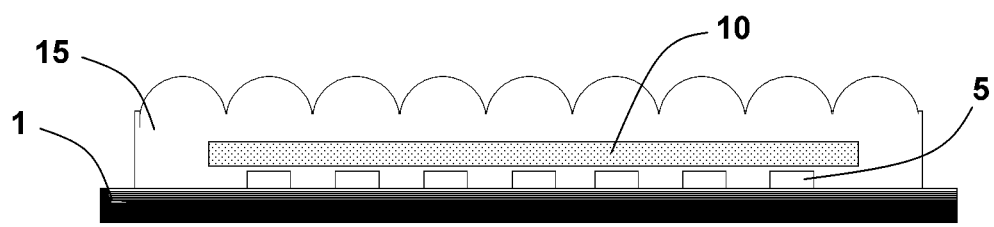
FIG. 2 is a schematic diagram of an alternate example of a device comprising a phosphor translucent ceramic disclosed herein.

In some embodiments, multiple LEDs may be incorporated in to a light emitting device. For example, one embodiment, illustrated in FIG. 2, has several blue-LEDs 5 which are fixed to the substrate 1. The phosphor translucent ceramic 10 in this embodiment is configured so that all of the blue-LEDs 5 are positioned between the substrate 1 and the ceramic 10.

Figure 3:
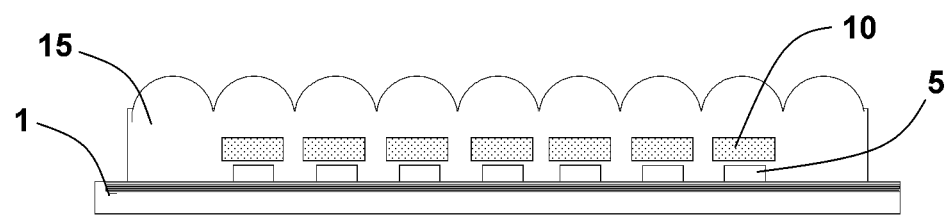
FIG. 3 is a schematic diagram of an alternate example of a device comprising a phosphor translucent ceramic disclosed herein.

In other embodiments, multiple emitting units comprising a blue-LED 5 and a phosphor translucent ceramic 10 are mounted on the substrate 1. For example, another embodiment illustrated in FIG. 3 has several blue-LEDs 5 fixed to the substrate 1. A multiplicity of the phosphor translucent ceramics 10 are each positioned such that one blue-LED 5 is positioned between the substrate 1 and one of the ceramics 10.

Figure 4:
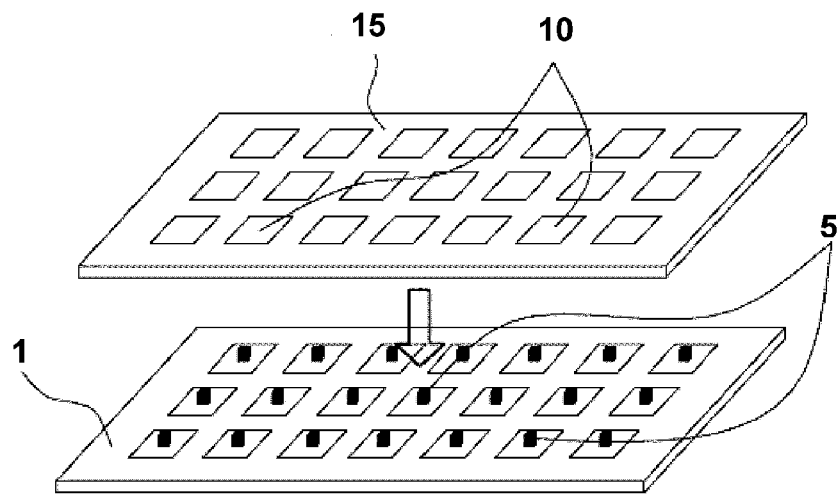
FIG. 4 shows another embodiment of a device comprising a phosphor translucent ceramic disclosed herein.
Figure 5:
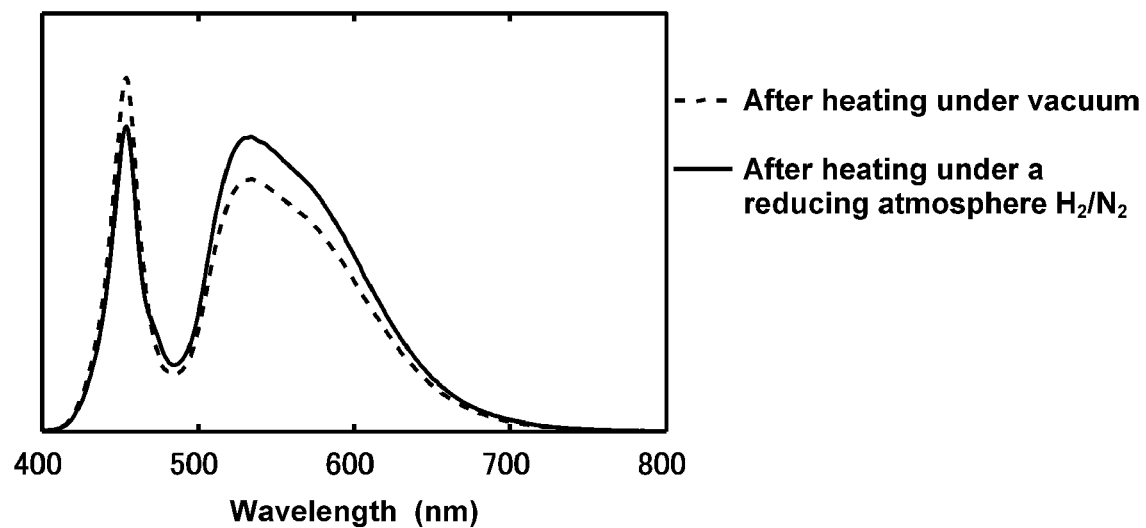
FIG. 5 is a plot of the luminance spectrum of a device comprising a phosphor translucent ceramic that had not been heated in the presence of a $H_2/N_2$ atmosphere compared to a device comprising a phosphor translucent ceramic that had been heated in the presence of a $H_2/N_2$ atmosphere.

In some embodiments, array type emitting units may also be assembled to form a light emitting device. As depicted in FIG. 4, an array of blue-LEDs 5 is mounted on the substrate 1. A corresponding array of phosphor translucent ceramics plates 10 is formed by embedding the phosphor translucent ceramics plates in the encapsulant resin 15. The matching arrays of phosphor translucent ceramics plates and blue-LEDs are then combined to form a light emitting device that emits whiter light.

Although the depicted phosphor translucent ceramics are flat plates, any shape and thickness of the ceramic may be utilized according to the design requirements.

EXAMPLE 1 a. Preparation of Raw Particles by Using Inductively Coupled RF Thermal Plasma Pyrolysis 0.1497 mol (57.337 g) of Yttrium (III) nitrate hexahydrate (99.9% pure, Sigma-Aldrich), 0.25 mol (93.785 g) of Aluminum nitrate nonahydrate (99.97 pure, Sigma-Aldrich), and 0.0003 mol (0.13 g) of Cerium (III) nitrate hexahydrate (99.99 pure, Sigma-Aldrich) were dissolved in 1000 ml of deionized water, followed by ultrasonication for 30 min to prepare completely transparent solution.

This precursor solution of 0.4 M was carried into a plasma reaction chamber via an atomization probe using a liquid pump. All deposition experiments were conducted with an RF induction plasma torch (TEKNA Plasma System, Inc PL-35) operating at 3.3 MHz. For the deposition experiments, the chamber pressure was kept around 25 kPa-35 kPa, and the RF generator plate power was in the range of 10-12 kW. Both the plate power and the deposition pressure are user-controlled parameters. Argon was introduced into the plasma torch as both the swirling sheath gas and the central plasma gas via the gas inlet ports. Sheath gas flow was maintained at 30 slm (standard liters per minute), while central gas flow was 10 slm.

Reactant injection was performed using a radial atomization probe (TEKNA Plasma System, Inc SDR-772). The probe was positioned at the center of the plasma plume during reactant injection. The reactants were fed into the plasma plume at a rate of 10 ml/min during deposition. Atomization of the liquid reactant was performed with Argon as atomizing gas delivered at a flow rate of 15 slm. Cooling water supply to the atomization probe was maintained at a flow rate of 4 slm and at 1.2 MPa pressure.

Crystalline phases of the deposited particles were investigated using X-ray diffraction (XRD) spectra obtained with a Bruker AXS micro-diffractometer (CuKα). The resultant spectra were compared with standard spectra of YAG, YAP and amorphous yttrium compounds to identify the resulting material. Standard spectra from National Institute of Standards and Technology (NIST) standard YAG (Joint Committee on Powder Diffraction Standards [JCPDS]) card number 00-33-00400 and yttrium aluminum perovskite standard JCPDS card number 00-54-0621 were used. The crystalline phase of the obtained sample identified as mixture of amorphous and yttrium aluminum perovskite (YAP).

The average particle diameter ($D_{avg}$) was obtained from BET surface area based on data acquired from a Micrometritics model Gemini 2365 gas sorptometer. Obtained $D_{avg}$ of the sample was 75 nm.

b. Confirmation of YAG:Ce Phosphor Property by Powder Shape Annealing

Before preparing phosphor translucent ceramics, luminescence efficiency dependence on annealing atmosphere was investigated by powder shape. Three raw powder samples (0.5 g) placed on alumina combustion boat were heated at 1500° C. (heating rate was 4° C./min) for 5 hours in air, vacuum, or reducing ambient of $H_2/N_2=3\%/97\%$ (v/v), respectively. These three samples turned yellow from plain white raw powder after the annealing due to crystallization to Ce-doped YAG phase. XRD also showed a single YAG phase. Tablet samples were prepared from the three YAG powder samples. Monochromatic blue light with peak wavelength of 460 nm was irradiated to the tablet sample, and luminance spectrum was acquired by photo detector (MCPD 7000, Otsuka Electronics, Inc) for each sample.

In addition, each powder sample was reheated at 1400° C. for 5 hours in reducing ambient of $H_2/N_2=3\%/97\%$ (v/v) and the luminance spectrum measurement was repeated. Table 1 shows a summary of relative peak values of luminance intensity. As shown in the first three entries of Table 1, luminance intensity of powder YAG phosphor initially heated in air or vacuum was poorer than the YAG powder heated in reducing ambient. However, the luminance efficiency of the air and vacuum heated YAG powders improved after reheating in a reducing atmosphere.

TABLE 1

| Annealing Condition | Relative PL Emission Peak Intensity |
|---|---|
| Air (1500° C., 5 hrs) | 0.73 |
| Vacuum (1500° C., 5 hrs) | 0.53 |
| $H_2/N_2 = 3\%/97\%$ (1500° C., 5 hrs) | 1.00 |
| Air (1500° C., 5 hrs) → $H_2/N_2 = 3\%/97\%$ (1400° C., 5 hrs) | 0.94 |
| Vacuum (1500° C., 5 hrs) → $H_2/N_2 = 3\%/97\%$ (1400° C., 5 hrs) | 0.98 |
| $H_2/N_2 = 3\%/97\%$ (1500° C., 5 hrs) → $H_2/N_2 = 3\%/97\%$ (1400° C., 5 hrs) | 1.02 | c. Preparation of Molded Precursor Compact

Raw powder (4 g) prepared by the previously mentioned RF plasma method, 0.21 g of poly(vinyl butyral-co-vinyl alcohol-co-vinyl acetate) (average Mw 90,000-120,000 powder, Sigma-Aldrich), 0.012 g of fumed silica powder (CAB-O-SIL® HS-5, Cabot Corporation), and 10 ml of methanol were mixed by mortar and pestle very well until the mixture slurry solution became very smooth. By blowing hot air from a dryer and keeping the pestle moving, methanol was completely removed and dried powder was obtained. Part (200 mg) of the dried powder was spread out into die set with 13 mm of diameter (Product#: 0012-6646, 3 mm KBr Die Set, International Crystal Laboratories, Inc), and 500 psi of pressure was applied to the powder using a hydraulic press. The molded precursor compact obtained by this pressure molding was heat treated at 800° C. (heating rate was 4° C./min) for 1 hr in air in order to remove binder resin.

EXAMPLE 2

Molded precursor compacts prepared and heat treated in air as described in Example 1 were heated for 5 hours under the conditions specified in Table 2 under the column "1st heating." This yielded YAG:Ce phosphor translucent ceramics disks which were 485 μm thick. The ceramics disks were then reheated for 5 hours under the conditions listed in Table 2 under the column "reheating" to obtain a reheated YAG:Ce phosphor translucent ceramic disk. "$H_2/N_2$" indicates $H_2/N_2=3\%/97\%$ (v/v). Yellow light emission from the reheated phosphor disks looked brighter than one time heated samples in vacuum. Transparency and luminance intensity were evaluated by appearance because precise measurements using instruments was impractical. The results are summarized in Table 2. As summarized in Table 2, the luminance intensity of the phosphor disk was improved by reheating under the $H_2/N_2=3\%/97\%$ (v/v) atmosphere without perceivable transparency reduction.

TABLE 2

| | Sintering condition | | Transparency | | PL emission intensity |
|---|---|---|---|---|---|
| Sample | 1st heating | Reheating | After 1st heating | After reheating | change after reheating |
| Example 1 | 1500° C. in vacuum | 1400° C. in $H_2/N_2$ | Translucent | Translucent | Improved |
| Example 2 | 1500° C. in vacuum | 1250° C. in $H_2/N_2$ | Translucent | Translucent | Improved |
| Example 3 | 1750° C. in vacuum | 1400° C. in $H_2/N_2$ | Considerably translucent | Considerably translucent | Improved |
| Comparative Example 1 | 1500° C. in air | 1400° C. in $H_2/N_2$ | Opaque | Opaque | Improved |
| Comparative Example 2 | 1500° C. in $H_2/N_2$ | 1400° C. in $H_2/N_2$ | Slightly opaque | Slightly opaque | Unchanged |
| Comparative Example 3 | 1400° C. in vacuum | 1400° C. in $H_2/N_2$ | Opaque | Opaque | Improved |
| Comparative Example 4 | 1500° C. in vacuum | 1400° C. in air | Translucent | Translucent | Unchanged |

EXAMPLE 3

The product of Example 1a (85 mg) was spread out into die set with a 13 mm diameter followed by applying a pressure of 5000 psi using hydraulic press. The resulting molded ceramics green compact was heat treated at 800° C. (heating rate was 4° C./min) for 1 hr in air in order to remove binder resin.

Two of previously obtained heat treated molded precursor compacts after binder removal were heated at 1500° C. (heating rate was 4° C./min for 5 hours) in vacuum. YAG:Ce phosphor translucent ceramics disks with thickness of 195 μm were obtained. One of the ceramics disks was reheated at 1400° C. for 5 hours in reducing ambient of $H_2/N_2=3\%/97\%$. Each phosphor disk was carefully cut down into the size of around 2 mm by using a diamond cutter to obtain small phosphor disk pieces.

A device like the one shown in FIG. 1 was then prepared. Each ceramic 10, e.g. a small phosphor disk piece, was mounted onto a blue LED 5 by the following procedure. Casting type epoxy resin (Nitto Denko Corporation, NT8080) was used as encapsulant resin. A very small amount of epoxy resin was put onto the blue LED 5 using a toothpick. The phosphor disk piece 10 was then carefully mounted onto LED 5 followed by temporal curing at 135° C. for 30 min. Additional epoxy resin was molded to form a dome shape encapsulant followed by full curing at 135° for 5 hours.

These LED devices with phosphor disk were driven using 20 mA of direct current at a 2.9V potential different, and white color emission was observed. The spectrum of each device, shown in FIG. 4, was acquired by using photo detector together with integrating sphere (MCPD 7000, Otsuka Electronics, Inc). FIG. 4 shows that the device prepared from the translucent phosphor compact which had been reheated under $H_2/N_2$ emits significantly more light in the 500-650 nm region, thus making the emitted light appear more white.

It will be appreciated by those skilled in the art that various omissions, additions and modifications may be made to the processes described above without departing from the scope of the invention, and all such modifications and changes are intended to fall within the scope of the invention.

What is claimed is:

1. A method of increasing the luminescence efficiency of a translucent phosphor ceramic, comprising:
   heating the translucent phosphor ceramic at a temperature in the range of about 1200° C. to about 1800° C. for a time period in the range of about 0.5 hours to about 20 hours under a reducing atmosphere, wherein said heating the translucent phosphor ceramic increases the luminescence efficiency, and wherein said phosphor translucent ceramic comprises a rare earth doped phosphor material having a garnet structure.

2. The method of claim 1, wherein the temperature is lower than the melting point of the translucent phosphor ceramic.

3. The method of claim 1, wherein the temperature is from about 1200° C. to about 1600° C.

4. The method of claim 1, wherein the heating is for a time period in the range of about 3 to about 20 hours.

5. The method of claim 1, wherein the reducing atmosphere comprises hydrogen gas.

6. The method of claim 5, wherein the reducing atmosphere comprises a mixture of from about 1% (v/v) to about 10% (v/v) hydrogen gas and about 90% (v/v) to about 99% (v/v) nitrogen gas.

7. The method of claim 1, wherein the translucent phosphor ceramic is prepared by a process comprising heating at least part of a plurality of particles at a temperature of from about 1450° C. to about 2000° C. under a vacuum.

8. The method of claim 7, wherein at least part of the plurality of particles is heated at a temperature of from about 1450° C. to about 2000° C. under a vacuum for about 3 to about 8 hours.

9. The method of claim 7, wherein the plurality of particles comprises [YAG:Ce] powder.

10. The method of claim 1, wherein said phosphor translucent ceramic comprises a composition of $(A_{1-x}E_x)_3B_5O_{12}$, wherein
   A is Y, Gd, La, Lu, Tb, or a combination thereof;
   x is from about 0.00005 to about 0.1;
   B is Al, Ga, In, or a combination thereof; and
   E is Ce, Eu, Tb, Nd, or a combination thereof.

11. The method of claim 10, wherein x is from about 0.0001 to about 0.01.

12. The method of claim 10, wherein x is from about 0.001 to about 0.005.

13. The method of claim 10, wherein A is Y.

14. The method of claim 10, wherein E is Ce.

15. The method of claim 10, wherein B is Al.

16. A method of increasing the luminescence efficiency of a translucent phosphor ceramic, comprising:
   heating the translucent phosphor ceramic under a reducing atmosphere at a temperature effective to increase the luminescence efficiency of the translucent phosphor ceramic, wherein the translucent phosphor ceramic comprises a rare earth doped phosphor material having a garnet structure.

17. The method of claim 16, wherein the rare earth doped phosphor material is YAG:Ce.

18. The method of claim 16, wherein the increase in luminescence comprises an at least about 10% increase in emission relative to the translucent phosphor ceramic before the heating under a reducing atmosphere.

19. The method of claim 16, wherein the temperature is lower than the melting point of the translucent phosphor ceramic.

20. The method of claim 16, wherein the temperature is from about 1200° C. to about 1800° C.

* * * * *